(12) United States Patent
Fehr et al.

(10) Patent No.: US 10,195,622 B2
(45) Date of Patent: *Feb. 5, 2019

(54) SPRAY SYSTEM PRESSURE DIFFERENTIAL MONITORING

(71) Applicant: Graco Minnesota Inc., Minneapolis, MN (US)

(72) Inventors: David L. Fehr, Champlin, MN (US); John R. Ingebrand, New Prague, MN (US); Dennis J. Van Keulen, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/905,522

(22) PCT Filed: Jul. 18, 2014

(86) PCT No.: PCT/US2014/047224
§ 371 (c)(1),
(2) Date: Jan. 15, 2016

(87) PCT Pub. No.: WO2015/010038
PCT Pub. Date: Jan. 22, 2015

(65) Prior Publication Data
US 2016/0153441 A1 Jun. 2, 2016

Related U.S. Application Data

(63) Continuation of application No. 61/856,104, filed on Jul. 19, 2013.

(51) Int. Cl.
*F04B 49/10* (2006.01)
*B05B 7/12* (2006.01)
(Continued)

(52) U.S. Cl.
CPC .............. *B05B 7/1254* (2013.01); *B05B 7/04* (2013.01); *B05B 7/24* (2013.01); *B05B 9/0406* (2013.01);
(Continued)

(58) Field of Classification Search
USPC ........................................................ 73/168
See application file for complete search history.

(56) References Cited

U.S. PATENT DOCUMENTS 3,455,511 A * 7/1969 Fedorenko ............... B64D 1/16
239/171
6,863,223 B2 * 3/2005 Rosa ...................... B05B 12/122
239/1

(Continued)

FOREIGN PATENT DOCUMENTS

CN 1607038 A 4/2005
CN 1711208 A 12/2005
(Continued)

OTHER PUBLICATIONS

Chinese Office Action from Counterpart Chinese Application Serial No. 201480039795.5, dated Mar. 28, 2017, 13 pages.
(Continued)

*Primary Examiner* — Clayton E Laballe
*Assistant Examiner* — Warren K Fenwick
(74) *Attorney, Agent, or Firm* — Kinney & Lange, P.A.

(57) ABSTRACT

A control method for a two-component spray system having first and second pumps for separate fluid components includes registering a target spray pressure, registering a material-specific pressure factor margin, sensing an output pressure of the second pump, and identifying a failure condition in the event that the sensed output pressure remains further than the pressure factor margin from the target spray pressure for at least a threshold time.

14 Claims, 5 Drawing Sheets

(51) Int. Cl.
- *B05B 15/55* (2018.01)
- *B05B 7/04* (2006.01)
- *B05B 7/24* (2006.01)
- *B05B 12/08* (2006.01)
- *B05B 12/14* (2006.01)
- *F04B 5/02* (2006.01)
- *F04B 7/02* (2006.01)
- *F04B 13/00* (2006.01)
- *F04B 15/02* (2006.01)
- *F04B 17/03* (2006.01)
- *F04B 19/22* (2006.01)
- *F04B 23/06* (2006.01)
- *F04B 39/02* (2006.01)
- *F04B 39/10* (2006.01)
- *F04B 49/22* (2006.01)
- *F04B 51/00* (2006.01)
- *F04B 53/10* (2006.01)
- *F04B 53/14* (2006.01)
- *F04B 53/16* (2006.01)
- *F16N 7/32* (2006.01)
- *G05D 11/13* (2006.01)
- *B05B 9/04* (2006.01)

(52) U.S. Cl.
CPC .......... *B05B 9/0413* (2013.01); *B05B 12/087* (2013.01); *B05B 12/149* (2013.01); *B05B 12/1418* (2013.01); *B05B 15/55* (2018.02); *F04B 5/02* (2013.01); *F04B 7/02* (2013.01); *F04B 13/00* (2013.01); *F04B 15/02* (2013.01); *F04B 17/03* (2013.01); *F04B 19/22* (2013.01); *F04B 23/06* (2013.01); *F04B 39/0292* (2013.01); *F04B 39/10* (2013.01); *F04B 49/10* (2013.01); *F04B 49/22* (2013.01); *F04B 51/00* (2013.01); *F04B 53/10* (2013.01); *F04B 53/14* (2013.01); *F04B 53/16* (2013.01); *F16N 7/32* (2013.01); *G05D 11/132* (2013.01); *B05B 7/0408* (2013.01); *B05B 7/2486* (2013.01); *B05B 7/2497* (2013.01); *B05B 9/04* (2013.01); *F04B 2201/0601* (2013.01)

(56) References Cited

U.S. PATENT DOCUMENTS

| | | | |
|---|---|---|---|
| 6,913,166 B2* | 7/2005 | Cline | B05B 12/1418 |
| | | | 222/135 |
| 6,957,780 B2* | 10/2005 | Rosa | B05B 12/122 |
| | | | 239/67 |
| 2004/0104244 A1 | 6/2004 | Cline et al. | |
| 2004/0262787 A1 | 12/2004 | Wulteputte | |
| 2005/0127088 A1 | 6/2005 | Gardos | |
| 2008/0197207 A1 | 8/2008 | Engelbrecht et al. | |
| 2010/0301134 A1 | 12/2010 | Anderton et al. | |
| 2012/0282121 A1 | 11/2012 | Kieffer et al. | |
| 2016/0167066 A1* | 6/2016 | Fehr | G05D 16/2066 |
| | | | 239/11 |

FOREIGN PATENT DOCUMENTS

| | | | | |
|---|---|---|---|---|
| CN | 102355955 A | 2/2012 | | |
| CN | 102497798 A | 6/2012 | | |
| EP | 2364952 A1 | 9/2011 | | |
| JP | S63296833 A | 12/1988 | | |
| JP | H07185409 A | 7/1995 | | |
| JP | 2003170103 A | 6/2003 | | |
| JP | 2008055292 A | 3/2008 | | |
| TW | 201116240 A | 5/2011 | | |
| WO | WO 2004042484 A2 * | 5/2004 | ........... | G05D 11/005 |

OTHER PUBLICATIONS

Extended European Search Report for EP Application No. 14825989.8, dated Mar. 16, 2017, 9 pages.

International Search Report and Written Opinion from PCT Application Serial No. PCT/US2014/047224, dated Nov. 6, 2014, 11 pages.

Taiwan Office Action from Application Serial No. 103125017, dated Dec. 26, 2017, 13 pages.

Japanese Office Action from Application Serial No. 2016-527134, dated May 30, 2018, 11 pages.

* cited by examiner

SPRAY SYSTEM PRESSURE DIFFERENTIAL MONITORING

BACKGROUND

The present invention relates generally to applicator systems that are used to spray fluids, such as paint, sealants, coatings, and the like. More particularly, the invention relates to pressure and flow diagnostics and failure-detection for a multiple fluid spray system such as a two-component fluid spray system.

Some fluid applicators are designed to combine and spray two or more separate fluid components. A two-component system, for example, might have separate "A-side" and "B-side" fluid systems (e.g. pumps, reservoirs, and fluid lines) that carry different fluid components. These components are isolated until sprayed or otherwise applied, whereupon the components mix and chemically interact to form an application material. Two-component fluid spray systems are commonly used to apply epoxies, foams, and two-component paints. Paint systems, for example, may combine A-side paints with B-side catalyst materials. Common catalyst materials include isocyanates, polyesters, epoxies, and acrylics. Different paints or other A-side materials may require different B-side catalysts.

A- and B-side fluid systems typically comprise separate fluid sources (e.g. reservoirs or lines) that are pumped via separate pumps to a common sprayer head actuated by a human operator or an automated machine process. Many two-component spray systems use gear pumps to provide adequate spray flow. Required spray pressures vary as a function of material and application, and desired flow rates of A- and B-side fluids often differ. Paints and catalysts intended to be combined in a 10-to-1 ratio, for instance, will necessitate A-side pump displacement ten times greater than B-side pump displacement.

In many applications a single spray system may be used to sequentially apply several different materials (e.g. different paints). Before new fluid materials can be pumped and sprayed, old materials must be flushed from pumping systems to prevent contamination. Flushing can involve significant wasted material, and pump pressures and flow rates may vary as pumping begins with a new material.

SUMMARY

In a first embodiment, a spray system includes first and second fluid sources, a sprayer, first and second pumps, first and second pressure sensors, and a controller. The first and second fluid sources are configured to provide first and second fluids, respectively. The sprayer is configured to combine and spray the first and second fluids. The first and second pumps are configured to pump the first and second fluids at variable first and second pumping speeds, respectively, from each pump to the sprayer. The first and second pressure sensors are disposed to sense first and second output pressures of the first and second pumps, respectively. The controller is configured to control the first and second pumps based on the first output pressure, and is further configured to identify a pump failure condition if the second output pressure differs from a target spray pressure by more than a pressure factor amount for more than a threshold duration.

In a second embodiment, a control method for a two-component spray system having first and second pumps for separate fluid components includes registering a target spray pressure, registering a material-specific pressure factor margin, sensing an output pressure of the second pump, and identifying a failure condition in the event that the sensed output pressure remains further than the pressure factor margin from the target spray pressure for at least a threshold time.

DETAILED DESCRIPTION

The present invention is a system and method for detecting pumping failures and faults in a secondary follow-along pump of a two-component spray system such as a paint, epoxy, or foam sprayer.

Figure 1:
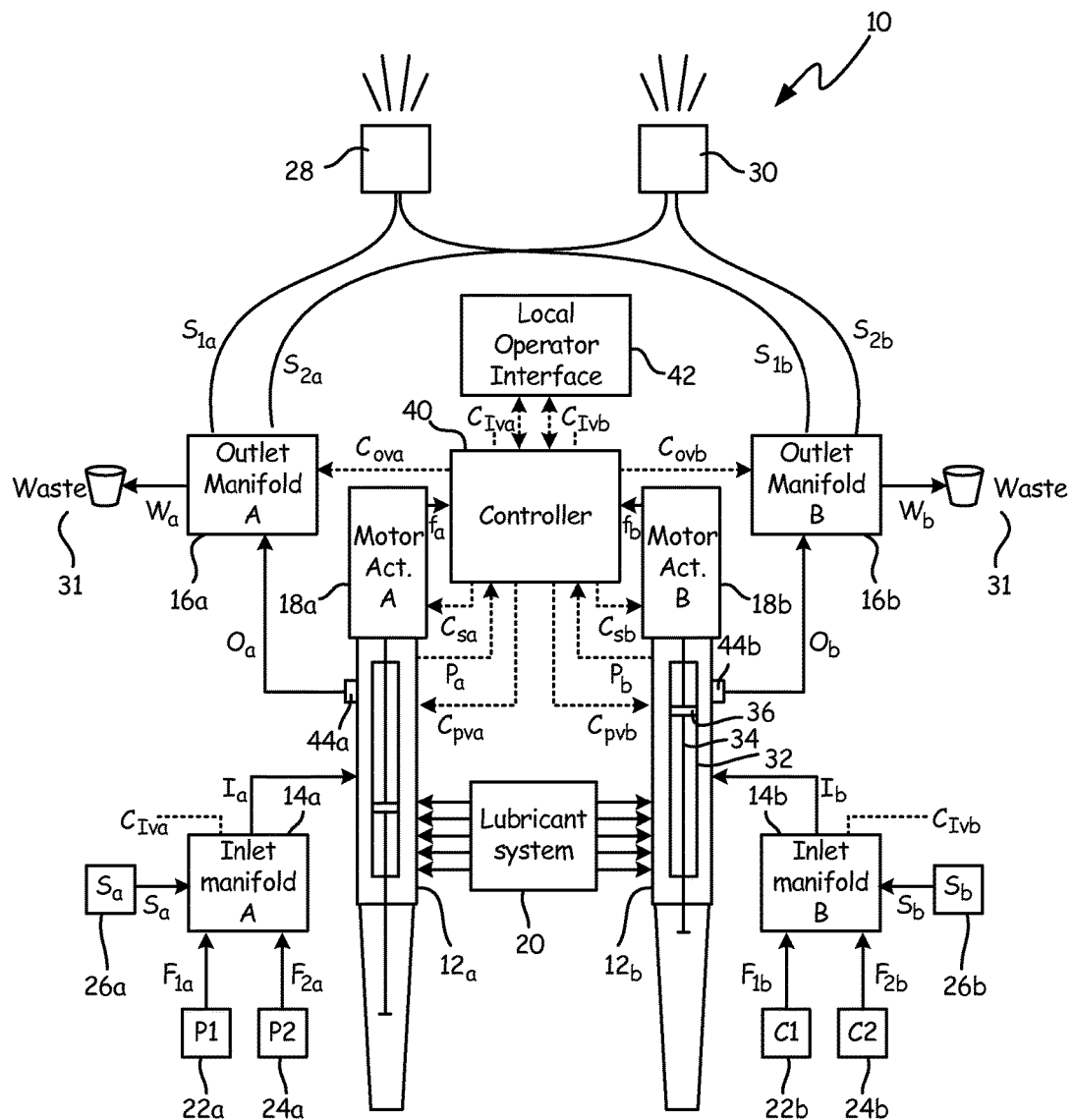
FIG. 1 is a schematic diagram of a spray system.

FIG. 1 is a schematic diagram of spray system 10, a two-side spray system with an A-side and a B-side configured to carry separate fluid components that are only combined when sprayed. Spray system 10 can, for example, combine an A-side paint with a B-side catalyst (e.g. a polyurethane, acrylic, polyester, or epoxy) at the moment of spraying. Although spray system 10 will be discussed hereinafter primarily as a system for spraying paint, the present invention can analogously be applied to sprayers for foam, adhesive, and other materials. Many components of spray system 10 are present in parallel on both A- and B-sides of the system. For clarity, A-side components are labeled with an "a" subscript, while B-side components are labeled with a "b" subscript. Hereinafter, reference numbers without subscript will be used to refer generically to elements found in parallel on both A- and B-sides of spray system 10, and to single elements common to both sides, while particular A- or B-side counterparts will be denoted with "a" or "b" subscripts, as appropriate. "Pump 12a" and "pump 12b," for example, are specific elements of the A- and B-side subsystems of spray system, respectively. Description related to "pump 12" (without subscript) refers generically to pump.

Spray system 10 includes A- and B-side pumps 12 that pump fluid from inlet manifolds 14 via inlet lines $I_a$ and $I_b$ to outlet manifolds 16 via outlet lines $O_a$ and $O_b$. In the depicted embodiment, pumps 12 are double-action reciprocating cylinder pumps driven by motorized actuators 18, with seals lubricated by lubricant system 20. Motorized actuators 18 can, for example, be linear DC step motors. Lubricant system 20 includes at least one lubricant reservoir and fluid routing lines suited to carry lubricant from lubricant system 20 to valve seals and other throat seals of pumps 12. Although lubricant system 20 is illustrated as a unitary system, some embodiments of spray system 10 can use separate A- and B-side lubricant systems, e.g. with different lubricants.

Inlet and outlet manifolds 14 and 16, respectively, are valved manifolds that selectively couple pumps 12 to a plurality of fluid sources and outputs. Inlet and outlet manifolds 14 and 16 allow spray system 10 to switch between a plurality of connected fluids without any need to disconnect or reconnect fluid lines. Although each outlet manifold 16 is depicted with three outlets and each inlet manifold 14 is depicted with three inlets, any number of inlets and outlets can be used. Under ordinary operating conditions, valving in manifolds 14 and 16 allows only one input or output line to be open at a time. In some embodiments, inlet and outlet manifolds 14 and 16 are controlled electronically, as discussed in greater detail below with respect to controller 40. In other embodiments, inlet and outlet manifolds 14 and 16 can be actuated manually. Some embodiments of spray system 10 can allow for both electronic and manual valve actuation of inlet and outlet manifolds 14 and 16.

In the depicted embodiment, inlet manifolds 14 selectively connect pumps 12 to primary fluid sources 22 and 24 via fluid lines $F_1$ and $F_2$, respectively, and to solvent sources 26 via solvent lines S. Primary fluid sources 22a and 24a can, for example, be first and second paints P1 and P2, while primary fluid sources 22b and 24b can, for example, be first and second catalyst fluids C1 and C2. Solvent sources 26a and 26b can draw upon a common reservoir of solvent material, or can use different solvent materials.

In the depicted embodiment, outlet manifolds 16 similarly selectively connect pumps 12 to sprayers 28 and 30 via spray lines $S_1$ and $S_2$, and to waste fluid dump 31 via waste lines W. Waste fluid dump 31 accepts waste paint, catalyst, and solvent flushed from spray system 10 (e.g. when switching from first paint P1 and first catalyst fluid C1 to second paint P2 and second catalyst fluid C2). Sprayers 28 and 30 each accept spray lines from both A-side and B-side outlet manifolds 16. Sprayer 28, for example, accepts spray line $S_{1a}$ from A-side outlet manifold $16_a$ and spray line $S_{1b}$ from B-side outlet manifold $16_b$. Although only two sprayers 28 and 30 are depicted in FIG. 1, any number of separate sprayers can be used. Each sprayer can be dedicated to a single spray fluid combination (e.g. of paint and catalyst), to avoid mixture or fouling of different fluids. Accordingly, embodiments with additional fluid sources advantageously include additional sprayers, as well. Alternatively, sprayers need not be devoted to particular fluid combinations, but can be used sequentially for multiple different fluid combinations, if washed between spray sessions with different fluids. Sprayers 28 and 30 can, for example, be user-triggered spray guns or machine-actuated automatic sprayers.

In some embodiments, primary fluid sources 22 and 24 and solvent sources 26 are pre-pressurized sources capable of supplying at least 50% of output pressure of pumps 12. Pre-pressurized sources alleviate pumping load on motorized actuators 18, such that pumps 12 need only supply less than 50% (per the previously stated case) of output pressure. Sources 22, 24, and 26 can include dedicated pumps for pre-pressurizing fluids.

In the depicted embodiment, pumps 12 are metered linear pumps with dosing cylinders 32 that carry displacement rods 34. Displacement rods 34 are driven by motorized actuators 18, and both situate and drive plungers 36. In some embodiments, dosing cylinders 32, displacements rods 34, and plungers 36 may be balanced in working surface area so as to receive equal pressure from pre-pressurized sources (e.g. 22, 24) on up- and down-strokes.

The motor speed of motorized actuators 18 is variable, and determines the displacement of pumps 12. Displacement rods 34 extend into rod reservoirs 38, which can in some embodiments be flooded with lubricant from lubricant system 20. Pumps 12 each have inlet and outlet valves that actuate between up- and down-strokes of displacement rods 34 to direct fluid above or below plungers 36.

Spray system 10 is controlled by controller 40. Controller 40 is a computing device such as a microprocessor or collection of microprocessors with associated memory and local operator interface 42. Local operator interface 42 is a user interface device with, e.g. a screen, keys, dials, and/or gauges. In some embodiments of the present invention, local operator interface 42 can be a wired or wireless connection for a user operated tablet or computer. In other embodiments, local operator interface 42 can be an integrated interface configured to accept direct user input and provide diagnostic and operational data directly to a user. Local operator interface 42 can, for example, enable a user to input target ratios of A- and B-side fluid flow for each combination of A- and B-side fluids, and target output pressure. Local operator interface 42 can also provide users with diagnostic information including but not limited to failure identifications (e.g. for clogging or leakage), spray statistics (e.g. fluid volume sprayed or remaining), and status indications (e.g. "cleaning," "spraying," or "offline"). In some embodiments, controller 40 may include a database of known or previous configurations (e.g. target ratios and/or pressures for particular materials), such that a user at local operator interface 42 need only select a configuration from several options.

Controller 40 controls motorized actuators 18 via motor speed control signals $c_s$ and controls pump valving of pumps 12 via pump valve control signals $c_{PV}$. Controller 40 synchronizes valve actuation of pumps 12 with pump changeover to minimize downtime as plungers 36 reaches the top or bottom of their travel distances within dosing cylinder 32. In some embodiments, controller 40 may also control valving of inlet manifolds 14 and outlet manifolds 16 via inlet valve control signals $c_{IV}$ and outlet valve control signals $c_{OV}$, respectively. Controller 40 receives sensed pressure values $P_a$ and $P_b$ from pressure sensors 44a and 44b, respectively, and receives encoder feedback data $f_a$ and $f_b$ reflecting motor states from motorized actuators 18a and 18b, respectively.

Pumping system 10 provides substantially uniform and continuous spray pressure through pump changeovers at specified pressures and material ratios. Pumping system 10 enables clean and efficient pumping and fluid switching without risk of fluid contamination, and without need for lengthy downtimes or large volume use of washing solvents.

Figure 2:
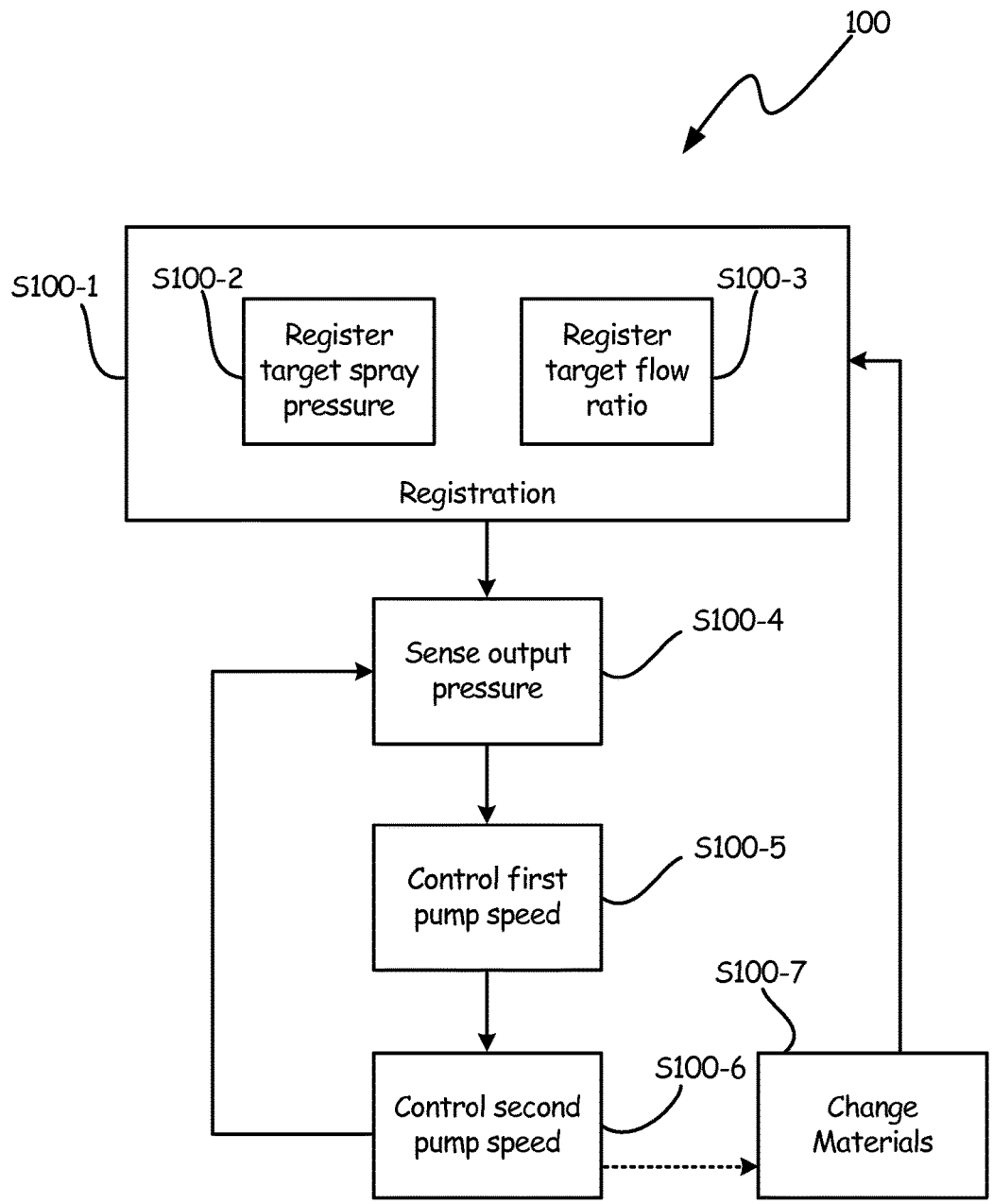
FIG. 2 is a method flowchart illustrating a method of pumping fluid pressure and ratio control for the spray system of FIG. 1.
Figure 3:
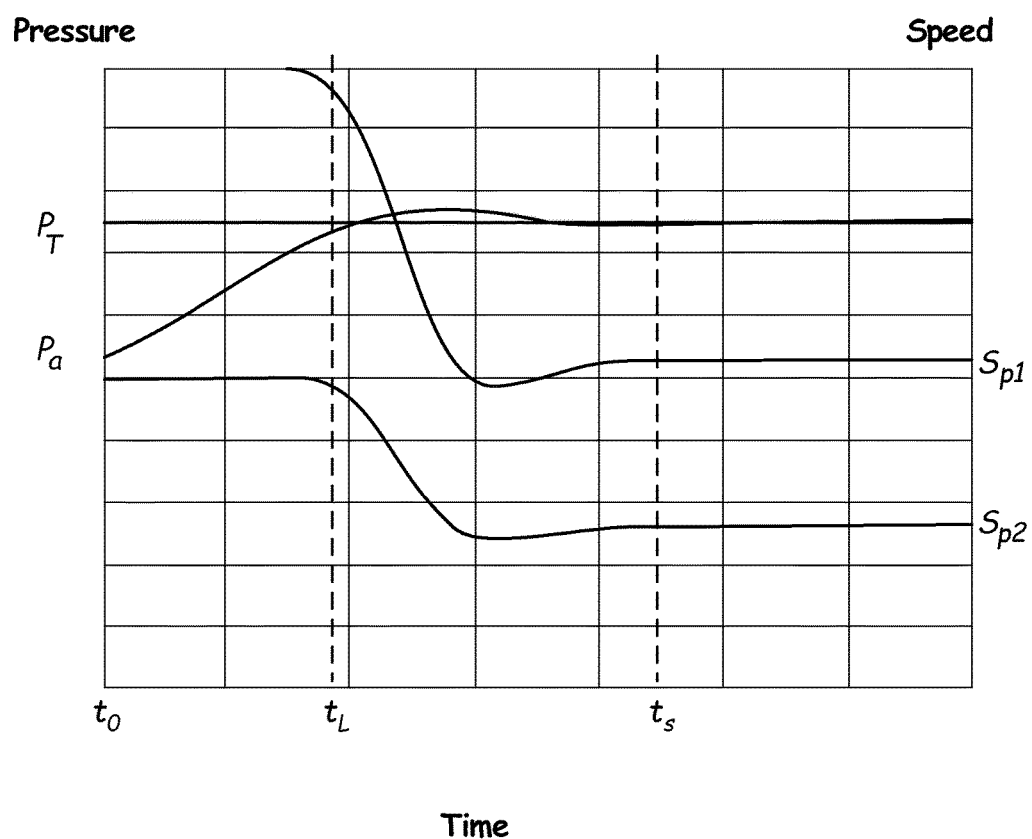
FIG. 3 is an example plot of pressure and pump speed as a function of time, illustrating the operation of the method of FIG. 2.

FIG. 2 is a method flowchart illustrating method 100. Method 100 is a control method for spray system 10 by which fluid pressure and flow rate are regulated. FIG. 3 is an example plot of A-side pump speed ($S_A$), B-side pump speed ($S_B$), and target pressure ($P_T$) as a function of time, according to the operation of method 100. First, configuration parameters are registered. (Step S100-1).

Configuration parameters include target spray pressure ($P_T$) and target flow ratio ($FR_T$), which may be set collectively or via separate steps S100-2 and S100-3, respectively, e.g. where $P_T$ has changed but target flow ratio ($FR_T$) remains unchanged, or vice versa. Spray pressure ($P_T$) and target flow ratio ($FR_T$) may be set manually by a human user through local operator interface 42, selected from a database of controller 40, or imported from a peripheral device. Target spray pressure ($P_T$) can, in some embodiments, be a target output pressure of the primary pump (i.e. 12a), rather than a generalized target pressure of the spray system as a whole.

Once configuration parameters have been registered, normal spray operation can begin, with pumps 12 pumping fluids from inlet manifolds 14 to outlet manifolds 16 and on to sprayers 28 or 30, as described above with respect to FIG.

1. Controller 40 controls pump speeds of pumps 12a and 12b based on sensed and target pressure. Although the A-side fluid system of spray system 10 is hereinafter described as the "primary" side and the B-side fluid system as the "secondary" side, alternative embodiments can reverse this order. During normal spray operation, pressure sensors 44a and 44b sense outlet pressures of pumps 12a and 12b, respectively. (Step S100-4). A primary pressure corresponding to A-side outlet pressure $P_a$ drives a proportional-integral-derivative control loop at controller 40 to produce speed control signal $c_{Sa}$ governing motorized actuator 18a, such that A-side outlet pressure $P_a$ is constrained towards primary pumping speed $S_{P1}$ to produce target pressure ($P_T$). (Step S100-5). Controller 40 produces speed control signal $c_{Sb}$ governing motorized actuator 18b by multiplicatively scaling speed control signal $c_{Sa}$ by target flow ratio $FR_T$ to produce secondary pumping speed ($S_{P2}$). (Step S100-6). Since pump displacement is substantially proportional to pumping speed, scaling the speed of motorized actuator 18b after the speed of motorized actuator 18a ensures a uniform material ratio reaches sprayer 28 or 30 at an A-side outlet pressure $P_a$ that tends towards target pressure $P_T$ over time. B-side outlet pressure $P_b$ is not used to control motor speeds, but can be sensed for diagnostic purposes.

Controller 40 operates in a feedback loop with commanded pumping speed $S_{P1}$ affecting sensed A-side outlet pressure ($P_a$), and sensed A-side outlet pressure ($P_a$) determining speed control signals $c_{Sa}$ and $c_{Sb}$ via the aforementioned proportional-integral-derivative control loop. In the event of a pumping halt, e.g. to change materials, method 100 may restart at step S100-1 for new target spray pressure and flow ratios. (Step S100-7). Target flow ratios and spray pressures are material dependent. Different combinations of paint and catalyst, for example, may use paint and catalyst at varying ratios. Any material ratio appropriate to the combination of fluids can be used. In addition, differences in viscosity and environmental temperature may necessitate different target spray pressures $P_T$.

FIG. 3 provides an example plot of outlet pressure $P_a$ as compared to target spray pressure $P_T$, and of primary and secondary pumping speeds $S_{P1}$ and $S_{P2}$, respectively, as a function of time. As illustrated in FIG. 3, outlet pressure $P_a$ tends substantially linearly from an initial time $t_0$ corresponding to the start of spraying or a material switchover towards target spray pressure $P_T$ until close to target spray pressure $P_T$, whereupon pumping speeds $S_{P1}$ and $S_{P2}$ begin to drop and outlet pressure $P_a$ begins to level off at time $t_L$. At a later time $t_S$, pumping speeds $S_{P1}$ and $S_{P2}$ and outlet pressure $P_a$ reach a substantially steady state with outlet pressure $P_a$ substantially equal to target pressure $P_T$.

Method 100 and spray system 10 rapidly adjust pumping speeds to achieve uniform desired pressures and material flow ratios through spraying events, material changeovers, and machine startup/shutdown events.

Figure 4:
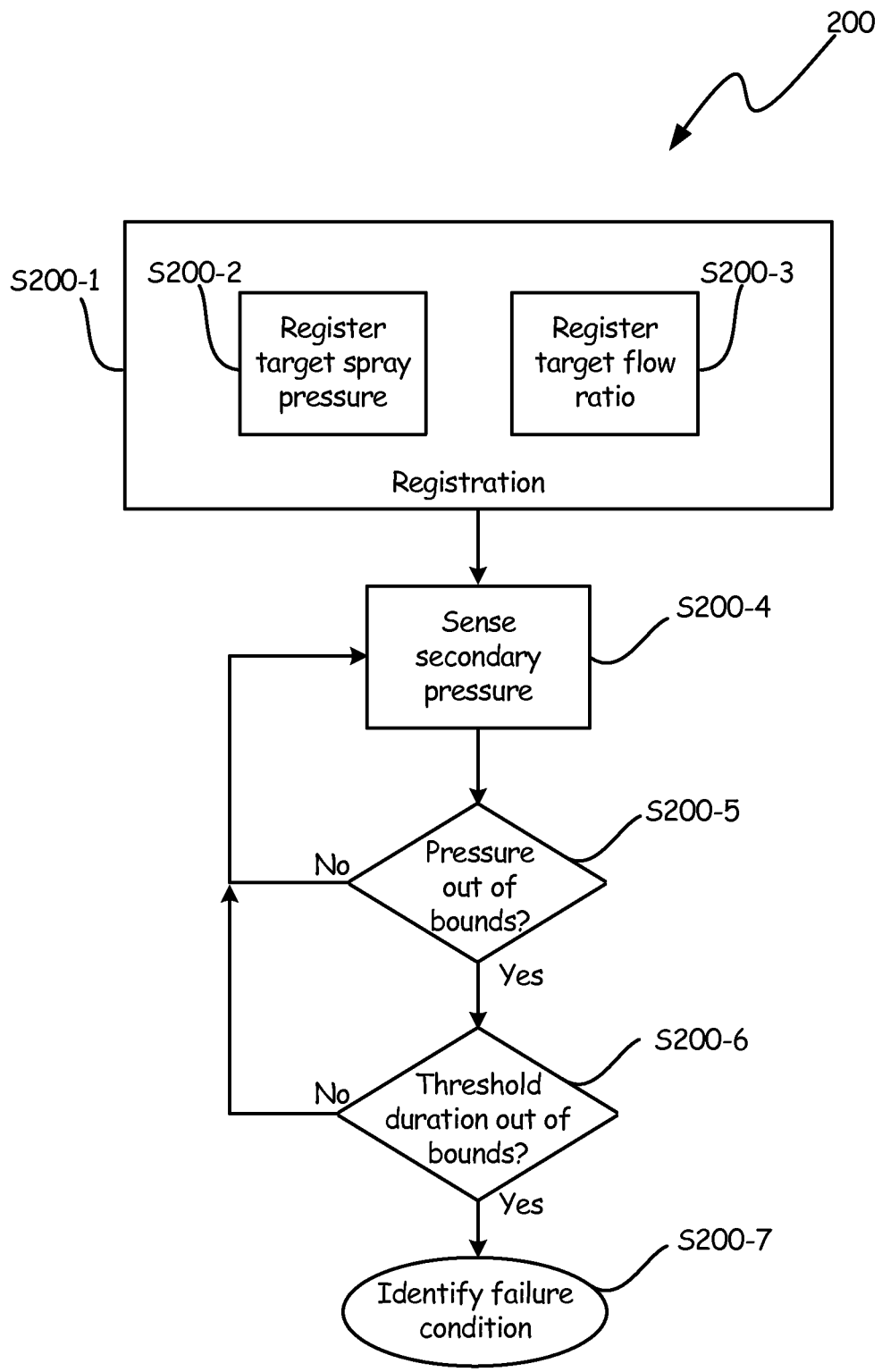
FIG. 4 is a method flowchart illustrating a method of monitoring differential pressure between A- and B-sides of the spray system of FIG. 1.
Figure 5:
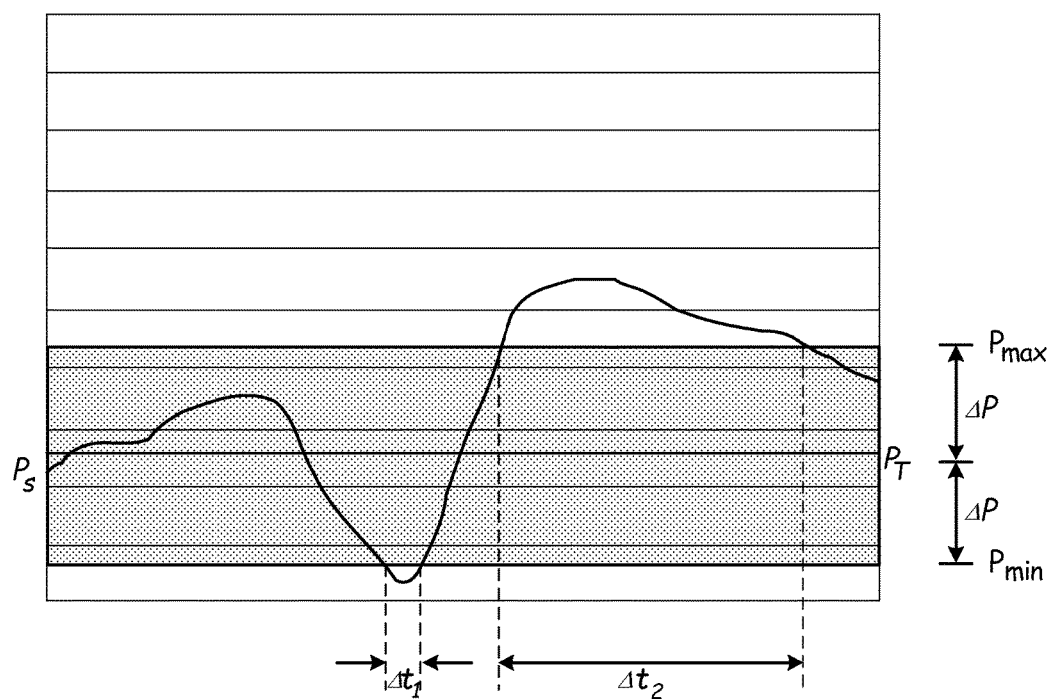
FIG. 5 is an example plot of pressure as a function of time, illustrating the operation of the method of FIG. 4.

FIG. 4 is a method flowchart illustrating method 200. Method 200 is a monitoring method for spray system 10 by which faults or failures such as leaks, blockages, and fluid source depletions. Since method 100 governs speeds of motorized actuators 18a and 18b based solely on a primary pressure feedback loop, failures in secondary flow (e.g. from blockage or leakage causing non-convergence towards target pressure $P_T$) will not affect method 100. Accordingly, method 200 provides a means of detecting both A- and B-side failures and alerting users to failure conditions. FIG. 5 is an example plot of pressure as a function of time illustrating one case of operation of method 200.

As discussed above with respect to FIG. 2, controller registers configuration parameters. (Step S200-1). Configuration parameters include target spray pressure $P_T$ and target pressure factor $\Delta P$, which can be registered separately as discussed above. (Step S200-2 and S200-3). Configuration parameters may also include an alarm interval ($\Delta t_A$), or alarm interval may be a preset, fixed duration. Target pressure factor $\Delta P$ is a degree of acceptable variation in secondary outlet pressure $P_S$ (i.e. outlet pressure $P_b$ where A- and B-sides constitute primary and secondary sides of spray system 10, respectively). Secondary outlet pressure $P_S$ may be expressed as a fractional part of target spray pressure $P_T$, or as an absolute pressure band width. In either case, target pressure factor $\Delta P$ is a margin value that defines maximum and minimum acceptable values $P_{Max}$ and $P_{Min}$ of secondary pressure $P_S$, respectively. Target pressure factor $\Delta P$ can, for example, be a material-specific value. Controller 40 senses second pressure $P_S$ continuously via pressure sensor 44b (Step S200-4) to determine whether pressure $P_S$ falls out of acceptable bounds (e.g. above $P_{Max}$ or below $P_{Min}$). (Step S200-5). If secondary pressure $P_S$ remains out-of-bounds for more than a threshold duration equal to alarm interval $\Delta t_A$ (Step S200-6), controller 40 identifies a failure condition. Alarm interval $\Delta t_A$ can be provided by a user, produced by controller 40 based on other configuration factors, or preset. FIG. 5 illustrates two out-of-bounds time intervals $\Delta t_1$ and $\Delta t_2$, with $\Delta t_1 < \Delta t_2$. Where $\Delta t_1 < \Delta t_A < \Delta t_2$, for example, controller 40 may flag an alarm or failure condition during $\Delta t_2$, but not during $\Delta t_1$. Alarm interval $\Delta t_A$ and pressure factor $\Delta P$ reflect degrees of operational tolerance with respect to variation in secondary pressure $P_S$. Alarm interval $\Delta t_A$ and pressure factor $\Delta P$ may vary depending on application requirements, fluid viscosities, and flow rates.

Controller 40 identifies failure conditions and alerts a user via local operator interface 42 whenever secondary pressure remains out of bounds for more than alarm interval $\Delta t_A$. (Step S200-7) Identifying failure conditions comprises flagging a failure event, and may further include categorizing the failure event by type, e.g. differentiating between under-pressure (which may correspond to leakage) and overpressure (which may correspond to blockage). By alerting users to sustained departure of secondary pressures $P_S$ from the tolerance range defined by target pressure $T_P$ and pressure factor $\Delta P$, method 200 provides diagnostics for secondary pressure not otherwise available through method 100. To avoid false alerts, method 200 may be suspended during times when substantial pressure fluctuation is expected, e.g. during startup or at pump changeovers.

Discussion of Possible Embodiments

The following are non-exclusive descriptions of possible embodiments of the present invention.

A spray system comprising: a first fluid source configured to provide a first fluid; a second fluid source configured to provide a second fluid; a sprayer configured to combine and spray the first and second fluids; a first pump configured to pump the first fluid at a variable first pumping speed from the first fluid source to the sprayer; a second pump configured to pump the second fluid at a variable second pumping speed from the second fluid source to the sprayer; a first pressure sensor disposed to sense a first output pressure of the first pump; a second pressure sensor disposed to sense a second output pressure of the second pump; and a controller configured to control the first and second pumps based on the first output pressure, and configured to identify a pump failure condition if the second output pressure differs from a target spray pressure by more than a pressure factor amount for more than a threshold duration.

The spray system of the preceding paragraph can optionally include, additionally and/or alternatively, any one or more of the following features, configurations and/or additional components:

A further embodiment of the foregoing spray system, wherein the target spray pressure is a target output pressure of the first pump.

A further embodiment of the foregoing spray system, wherein the controller is configured to control the first pump via a proportional-integral-derivative loop, and to control the second pump to follow the first pump at a target primary-to-secondary spray component flow ratio.

A further embodiment of the foregoing spray system, wherein the first and second pumps are positive displacement reciprocating pumps.

A further embodiment of the foregoing spray system, wherein failure condition identification is disabled while the first and second pumps are changing over.

A further embodiment of the foregoing spray system, wherein failure condition identification is disabled during a startup period of the first and second pumps.

A further embodiment of the foregoing spray system, wherein the first fluid is a paint.

A further embodiment of the foregoing spray system, wherein the second fluid is a catalyst.

A further embodiment of the foregoing spray system, wherein the pressure factor amount is a function of the viscosity of at least the second fluid.

A further embodiment of the foregoing spray system, further comprising a local operator interface configured to accept inputs of the target spray pressure, the material-specific pressure factor margin, and the threshold duration from a user.

A control method for a two-component spray system having first and second pumps for separate fluid components, the method comprising: registering a target spray pressure; registering a material-specific pressure factor margin; sensing an output pressure of the second pump; and identifying a failure condition in the event that the sensed output pressure remains further than the pressure factor margin from the target spray pressure for at least a threshold time.

The control method of the preceding paragraph can optionally include, additionally and/or alternatively, any one or more of the following features, configurations and/or additional components:

A further embodiment of the foregoing control method, wherein the threshold time is a function of combination of the first and second materials.

A further embodiment of the foregoing control method, further comprising logging user input.

A further embodiment of the foregoing control method, wherein the user input includes the target spray pressure, the material-specific pressure factor margin, and the threshold time.

A further embodiment of the foregoing control method, wherein identifying a failure condition comprises identifying at least one of an underpressure event and an overpressure event.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A spray system comprising:
   a first fluid source configured to provide a first fluid comprising a first material;
   a second fluid source configured to provide a second fluid comprising a second material;
   a sprayer configured to combine and spray the first and second fluids;
   a first pump configured to pump the first fluid at a variable first pumping speed from the first fluid source to the sprayer;
   a second pump configured to pump the second fluid at a variable second pumping speed from the second fluid source to the sprayer;
   a first pressure sensor disposed to sense a first output pressure of the first pump;
   a second pressure sensor disposed to sense a second output pressure of the second pump; and
   a controller configured to control the first and second pumps based on the first output pressure, and configured to a pump failure condition if the second output pressure differs from a target spray pressure by more than a material-specific pressure factor amount for more than a threshold duration, the threshold duration being a function of the first and second materials.

2. The spray system of claim 1, wherein the controller is configured to control the first pump via a proportional-integral-derivative loop, and to control the second pump to follow the first pump at a target primary-to-secondary spray component flow ratio.

3. The spray system of claim 1, wherein the first and second pumps are positive displacement reciprocating pumps.

4. The spray system of claim 1, wherein the first fluid comprises a paint.

5. The spray system of claim 1, wherein the second fluid comprises a catalyst.

6. The spray system of claim 1, further comprising a local operator interface configured to accept inputs of the target spray pressure, the material-specific pressure factor margin, and the threshold duration from a user.

7. A control method for a two-component spray system having first and second pumps for separate first and second fluid components, the method comprising:
   registering a target spray pressure;
   registering a material-specific pressure factor margin;
   sensing an output pressure of the second pump; and
   identifying a failure condition if that the sensed output pressure differs from the target spray pressure more than the pressure factor margin for at least a threshold time
   wherein the threshold time is a function of a first fluid material and a second fluid material.

8. The control method of claim 7, wherein the target spray pressure is a target output pressure of the first pump.

9. The control method of claim 7, wherein failure condition identification is disabled while the second pump is changing over.

10. The control method of claim 7, wherein failure condition identification is disabled during a startup period of the second pump.

11. The control method of claim 7, wherein the pressure factor margin is a function of the viscosity of at least the second fluid material.

12. The control method of claim 7, further comprising logging user input.

13. The control method of claim 12, wherein the user input includes the target spray pressure, the material-specific pressure factor margin, and the threshold time.

14. The control method of claim 7, wherein identifying a failure condition comprises identifying at least one of an underpressure event and an overpressure event.

* * * * *